United States Patent [19]

Kragten

[11] Patent Number: 5,108,072
[45] Date of Patent: Apr. 28, 1992

[54] VARIABLE PRESSURE ELECTRICALLY OPERATED VALVE WITH AN ADJUSTABLE STROKE-LIMITING MECHANISM FOR THE ACTUATOR

[75] Inventor: Cornelis A. Kragten, Emmen, Netherlands

[73] Assignee: Honeywell Inc., Minneapolis, Minn.

[21] Appl. No.: 675,394

[22] Filed: Mar. 26, 1991

[30] Foreign Application Priority Data

Mar. 31, 1990 [EP] European Pat. Off. ........ 90106222.4

[51] Int. Cl.⁵ .................... F16K 31/08; H02K 33/18
[52] U.S. Cl. ..................... 251/129.01; 251/129.08; 310/13; 310/27
[58] Field of Search ............. 251/65, 905, 129.01, 251/129.08; 310/13, 27

[56] References Cited

U.S. PATENT DOCUMENTS

| | | | |
|---|---|---|---|
| 3,417,268 | 12/1968 | Lace | 310/27 X |
| 3,430,538 | 3/1969 | Weiss | |
| 4,544,129 | 10/1985 | Ichiryu et al. | 251/129.01 |
| 4,555,645 | 11/1985 | Atkinson | 310/13 X |

FOREIGN PATENT DOCUMENTS 078496 10/1982 European Pat. Off.
127854 5/1984 European Pat. Off.
883537 11/1961 United Kingdom.

*Primary Examiner*—Arnold Rosenthal
*Attorney, Agent, or Firm*—Edward Schwarz

[57] ABSTRACT

The moving coil actuator of a pressure regulator has two threaded adjustment screws each mounted parallel to the actuator's path and which project through a limit surface of a carrier for the moving oil actuator. Both adjusting screws can be rotated by means of a tool, but their mounting prevents them from being moved longitudinally. Each of the adjustment screws carries a limit element, one on each side of the carrier's limit surface. The position of each of the limit elements on its adjustment screw is adjustable by means of an internal thread. In the preferred embodiment, each adjustment screw is partly enveloped by a projection on the limit element carried by the other adjustment screw, by which each limit element is secured against rotation during adjustment. The limit elements independently limit the stroke of the moving coil at each end by blocking movement of the limit surface when the actuator reaches its desired limit.

10 Claims, 2 Drawing Sheets

VARIABLE PRESSURE ELECTRICALLY OPERATED VALVE WITH AN ADJUSTABLE STROKE-LIMITING MECHANISM FOR THE ACTUATOR

BACKGROUND OF THE INVENTION

Valves, pressure regulators and other apparatus having an element which must be moved linearly, sometimes require a limitation of the permitted stroke as well as the capability of adjusting the position of the stroke range between the permissible end positions of the stroke. Typically these valves, etc. are operated by an electrical actuator.

BRIEF DESCRIPTION OF THE INVENTION

The invention is for a stroke-limiting mechanism for a movable actuator element using two adjustable limit elements, one on each side of the actuator element which limit the actuator element to movement only between the limit elements. It is a particular object of the invention to provide stroke adjusting means for an actuator comprising the moving coil of an electrically controllable pressure regulator as it is used in gas control apparatus. It is a further object of the invention to find a simple and inexpensive solution which guarantees an accurate and reproducible adjustment, which can be adjusted easily, and which occupies little space. These and other objects are achieved by the invention as characterized in the claims.

The principle underlying the present invention involves the use of the two adjustment screws on which are carried the limit elements. Each adjustment screw is used for adjusting one of the two limit elements and the other adjusting screw simultaneously prevents rotation of the limit element carried on the other adjustment screw.

Further details of the invention and its advantages will be described with reference to a preferred embodiment

BRIEF DESCRIPTION OF THE DRAWINGS

In the accompanying drawings.

DESCRIPTION OF THE PREFERRED EMBODIMENT

Figure 1:
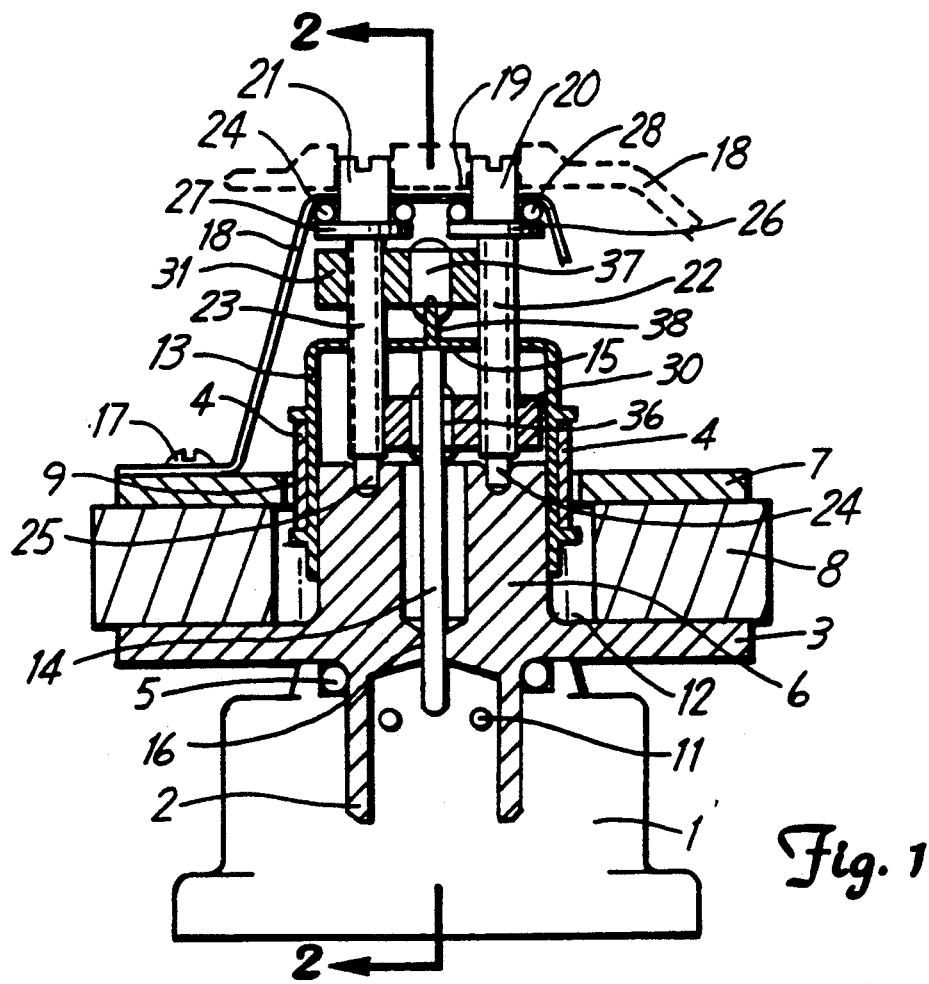
FIG. 1 shows a sectional view of the stroke-adjusting mechanism.
Figure 2:
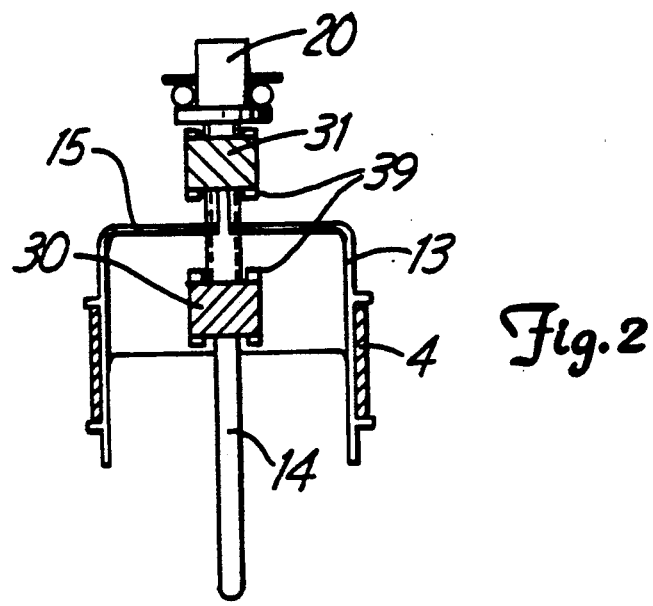
FIG. 2, a sectional view of the abutments and the moving coil taken along line II—II of FIG. 1.
Figure 3:
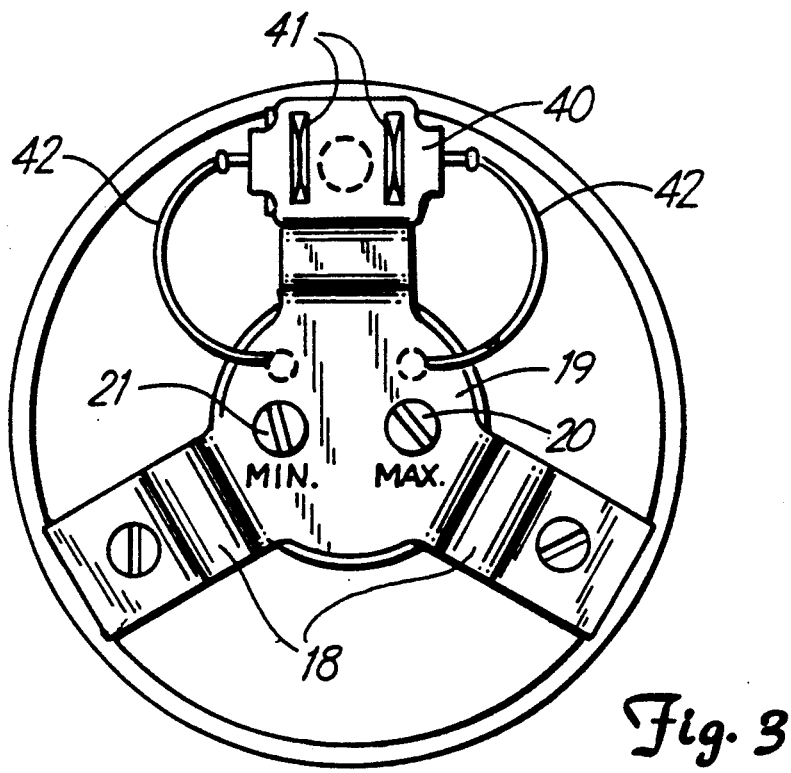
FIG. 3, a top view on the adjusting mechanism.

Turning first to FIGS. 1-3, the embodiment of the invention shown therein has a moving coil 4, not shown in detail, serving as the actuator for operating a pressure regulator. 1 A magnetic flux generator includes a yoke 3 for the moving coil 4, which yoke is fixed on top of the housing of pressure regulator 1 by means of a projecting portion 2 and is sealed by means of an O-ring 5. In addition to yoke 3, the magnetic flux generator includes a central core 6 which is unitary with yoke 3, a ring-shaped plate 7, and a ring-shaped permanent magnet 8 magnetized in its axial direction and located between yoke 3 and plate 7. An annular flux gap 9 is formed between the outer surface of core 6 and the inner edge of plate 7. The central core 6 has extending through itself a centrally located axial bore.

Coil 4 is wound on the outside of the curved wall of a cup-shaped carrier 13 which opens downwardly (as shown in FIG. 1). The carrier 13 is shown as having a substantially flat bottom 15 with reference to the cup shape thereof, to which bottom is attached a central operating pin 14 which also projects downwardly and through the core 6 Moving coil 4 and the wall of carrier 13 can enter and slide within flux gap 9 and is restricted to linear motion along an operation axis by interaction between the interior of the wall of carrier 13 and the exterior surface of core 6 which defines one side of the flux gap. It is also necessary that there be some means to prevent rotation of carrier 13 around its operation axis, for reasons to be discussed below This anti-rotation means can take the form of slots or splines, not shown, on core 6 and carrier 13 which mesh with each other For feeding current to moving coil 4 a connector block 40 is fixed to support 18, and contact bushings 41 are electrically connected by flexible wires 42 to moving coil 4 as may be seen in FIG. 3. To prevent the justmentioned rotation of carrier 13, I prefer, however, to use the stiffness of the wires 42 as shown in FIG. 3 to provide torque which maintains the carrier 13 in its rotationally centered position. This has the desirable feature of limiting frictional forces on carrier 13 as it moves under the influence of current flow in coil 4.

Downward movement of carrier 13 under the urging of magnetic force arising from current flow in coil 4 is opposed by the force of a spring 11 provided within the pressure regulator 1. An additional small spring 12 compensates for the weight of moving coil 4 and its carrier 13 so that the operation of spring 11 is not affected by the weight of coil 4 and carrier 13. FIG. 2 shows the operating pin 14 connected within carrier 13 to the interior of its downward-facing bottom 15 to operate the diaphragm of pressure regulator 1 in the usual manner. The lower end of pin 14 passes through and is guided by a hole 16 in the center of yoke 3. The alignment of the upper end 38 of pin 14 is maintained by the carrier 13 and its support by the outer surface of core 6.

FIG. 3 shows a support member 18 including three legs whose ends are fixed by means of rivets 17 to plate 7 and thus become unitary with the flux generator. This member 18 includes a central area in which are two holes through which project heads 20 and 21 respectively of two adjustment screws 22 and 23. The ends of these two adjustment screws 22 and 23 opposite heads 20 and 21 are respectively mounted for rotation or journaled in holes 24 and 25 in the surface of core 6 adjacent to the flux gap 9, and project from the top surface of core 6. The screws 22 and 23 pass through holes in the bottom 15 of carrier 13. These holes should be large enough to prevent any interference by the screws 22 and 23 with the bottom 15 as coil 4 translates along the operation axis. Each screw 22 and 23 has threads which extend along a portion of the body of each intermediate the heads 20 and 21 on the one hand and the respective ends opposite the heads 20 and 21 on the other. The adjustment screws 22 and 23 respectively support and position limit elements 30 and 31 whose purpose is to limit the range of motion for carrier 13. It is to prevent binding of carrier 13 on screws 22 and 23 during movement of carrier 13 and possible abrading of either the threads on screws 22 and 23 or the edges of the holes in carrier 13 through which they pass that carrier 13 is mounted to prevent any rotation by it around the operation axis. It is possible to place anti-friction sleeves of some type in the holes in bottom 15 to reduce this possible binding and abrasion, but it is preferred to use, as mentioned above, the stiffness of the wires 42 to angularly position carrier 13. Both heads 20 and 21 are provided with a slot for adjustment of its respective screw by a screwdriver.

Adjustment screws 22 and 23 are mounted between the central surface of support member 18 and the surface of core 6 facing the central surface of core 6 so as to prevent any axial movement by them. To accomplish this, annular flanges or collars 26 and 27 integral with the adjustment screws 22 and 23 respectively are provided adjacent their heads 20 and 21 to cooperate with member 18 to hold screws 22 and 23 in the locations shown. Respective O-rings 28 and 24 are interposed between flanges 26 and 27 and the central surface of member 18 facing core 6. The adjustment screws 22 and 23 are thus held in the positions shown in FIG. 1 between the central surface 19 of member 18 on the one hand and the surface of core 6 on the other to prevent their axial translation. The adjustment screws 22 and 23 are in this manner maintained parallel to each other and in alignment with the operation axis for the movement of moving coil 4. Member 18 also supports a cover plate 48 for regulator 1, in which cover plate 19 are two holes aligned with the two holes in the member 18 and the heads 20 and 21 therein, so that adjustment of screws 22 and 23 can take place without removing the cover plate 19.

Figure 4:
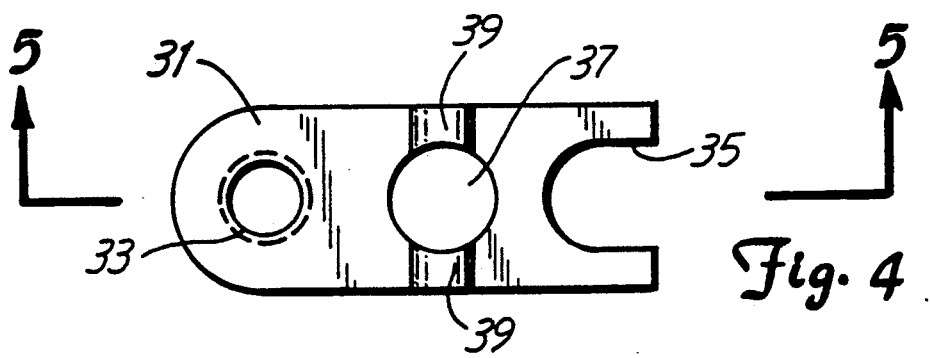
FIG. 4, one of the abutment pieces.
Figure 5:
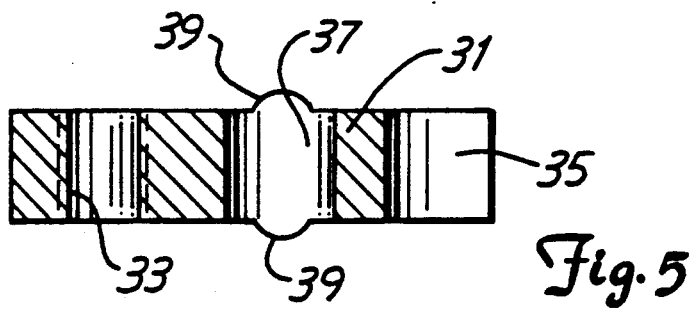
FIG. 5, a section view of the abutment piece along line V—V.

The stroke of moving coil 4 and thereby the stroke of operating pin 14 can be adjusted by means of the two similar limit elements 30 and 31. Limit element 31 (see FIG. 4) has an internally threaded hole 33 into which adjustment screw 23 is threaded and whose rotation sets the position of the limit element 31 along the axis of screw 23 and the operation axis. Element 31 has a projecting anti-rotation feature comprising a generally forkshaped end 35 as shown in FIG. 4 which partially surrounds the other adjustment screw 22 in an interfering relation thereby preventing its rotation when screw 23 is rotated. Instead of the fork-shaped end 35 shown at the end of limit element 31, an unthreaded hole through piece 31 larger than the diameter of screw 22 may be used to prevent rotation of limit element 31. Adjustment screw 22 is threaded into a limit element 30 similar to element 31, and which can be moved with its internal thread along screw 22 by rotating its head 20. In this case also, the fork-shaped end of limit element 30 partially surrounds adjusting screw 23 to thereby prevent its rotation. Limit elements 30 and 31 are carried on their respective adjustment screws 20 and 21 with the bottom 15 between them, the bottom 15 thus serving as a limit surface whose interference with the limit elements 30 and 31 determines the end points of the stroke of coil 4. It is also possible to use features on limit elements 30 and 31 which cooperate with adjacent structure such as the carrier 13, the support member 18, or the operating pin 14 as the anti-rotation means for the limit elements 30 and 31.

Limit elements 30 and 31 may be designed as interchangeable and are provided with central through holes 36 and 37 respectively. Hole 37 in limit element 31 provides clearance for operating pin projection 38. Operating pin 14 passes through hole 36 in limit element 30. In order to assure a repeatable limit for the movement of coil 4 against the limit elements 30 and 31, both of these articles are provided with ribs 39 which engage moving coil carrier 13 at the selected extreme of its motion. Each limit element 30 or 31 carries its rib 39 on a surface facing the bottom 15 of carrier 13 which functions as the limit surface. The rib 39 projects from this surface and is located on limit element 30 or 31 so as to contact bottom 15 approximately in its center.

By rotating adjustment screw 22, the lower limit element 30 can be positioned as desired along the threaded length of screw 22 to adjust the lower limit for the position of carrier 13 and operating pin 14 and thereby allow adjusting of the limit to the downward stroke of moving coil 4. In this way, the maximum outlet pressure of pressure regulator 1 can be adjusted. With the other adjustment screw 23 and its associated limit element 31 the upper limit of the stroke of coil 4 may be adjusted independently of the lower limit to thereby select the minimum outlet pressure of regulator 1. It can thus be seen that the adjustment for each of the two stroke limits is independent from each other.

In order for clockwise turning of an adjustment screw 22 or 23 to decrease the associated pressure value and counterclockwise turning to increase the associated pressure value, which might be the minimum pressure or the maximum pressure respectively, it may be advisable to provide the adjustment screws 22 and 23 and the associated internal threads of limit elements 30 and 31 with left hand threads. It is, however, also possible to provide one screw with a right hand thread and the other with a left hand thread or to provide both screws with right hand threads.

The preceding describes my invention; what I wish to protect by letters patent is:

1. Apparatus for adjusting the limits for the stroke of a moving coil forming the control element of an electrically controllable pressure regulator, said coil linearly movable along an operation axis and within a flux gap of a magnetic flux generator, and comprising
    a) first and second stroke limit adjustment screws mounted on the flux generator, each screw having a longitudinal axis and an intermediate threaded portion projecting from the flux generator, and each screw mounted for rotation about its axis and parallel to the operating axis, the mounting for each of the adjusting screws preventing axial movement thereof;
    b) a carrier on which the coil is mounted, said carrier having a limit surface through which the adjusting screws pass;
    c) an operating pin for connecting the carrier to the pressure regulator; and
    d) first and second limit elements each having a threaded bore therethrough, said first and second limit elements respectively carried by and engaging the bores' threads on, the first and second adjustment screws, said first limit element positioned to place the carrier's limit surface between the first limit element and the flux generator, and the second limit element positioned between the carrier's limit surface and the flux generator, the first and second limit elements blocking movement of the carrier by contact with its limit surface as the carrier moves toward the first and second limit elements respectively,
    each limit element further comprising anti-rotation means cooperating with adjacent structure of the apparatus, to prevent rotation of the limit element about the associated adjustment screw's axis.

2. The apparatus of claim 1, wherein the flux generator further comprises a support projecting from a surface of the flux generator adjacent the flux gap, and extending toward and supporting the ends of the projecting lengths of the adjustment screws.

3. The apparatus of claim 2, wherein the support includes a surface having first and second holes in alignment with the first and second adjustment screws respectively, and wherein the projecting ends of the adjustment screws each include a flange in interference with the support surface adjacent the respectively holes.

4. The apparatus of claim 3, wherein the flux generator surface adjacent the flux gap includes first and second holes in alignment with the first and second adjustment screws respectively, and in which the adjustment screws are journaled.

5. The apparatus of claim 2, wherein the support further includes a surface adjacent the ends of the projecting lengths of the adjustment screws in which are first and second holes in alignment with and through which project the respective ends of the adjustment screws.

6. The apparatus of claim 1, wherein the anti-rotation means of at least one limit element includes a portion projecting transversely with respect to the associated adjustment screw's operation axis and enveloping at least a part of the other limit element and in axial sliding relation with respect thereto.

7. The apparatus of claim 1, wherein the anti-rotation means of the second limit element includes a portion projecting transversely with respect to the second adjustment screw's operation axis and enveloping at least a part of the first limit element and in axial sliding relation with respect thereto, and having a bore through which the operating pin passes.

8. The apparatus of claim 1, wherein the carrier has a cup shape with a curved wall on which is wound the coil and which is adapted to enter and slide in the flux gap of the flux generator, and with a substantially flat bottom, said flat bottom comprising the limit surface, said flat bottom having first and second holes through which the first and second adjustment screws pass, said carrier enclosing second limit element.

9. The apparatus of claim 1, wherein at least one of the limit elements includes a rib projecting from the surface of the limit element facing the limit surface of the carrier.

10. The apparatus of claim 9, wherein the rib is positioned on the surface of its limit element so as to contact approximately the center of the limit surface.

* * * * *